United States Patent [19]

Yamashita

[11] Patent Number: 4,831,263

[45] Date of Patent: May 16, 1989

[54] POSITION-SENSITIVE RADIATION DETECTOR

[75] Inventor: Takaji Yamashita, Shizuoka, Japan

[73] Assignee: Hamamatsu Photonics Kabushiki Kaisha, Shizuoka, Japan

[21] Appl. No.: 169,025

[22] Filed: Mar. 16, 1988

[30] Foreign Application Priority Data

May 14, 1987 [JP] Japan ................................. 62-117885

[51] Int. Cl.⁴ .............................................. G01T 1/202
[52] U.S. Cl. ................................... 250/368; 250/487.1
[58] Field of Search ............ 250/367, 368, 366, 483.1, 250/484.1, 486.1, 487.1, 370.1

[56] References Cited

U.S. PATENT DOCUMENTS 4,069,421 1/1978 Bourdel ............................. 250/370.1
4,675,526 6/1987 Rogers et al. ....................... 250/368

FOREIGN PATENT DOCUMENTS 0112475   4/1984  European Pat. Off. .
WO83/03683 10/1983 PCT Int'l Appl. .
WO86/03596  6/1986 PCT Int'l Appl. .
2005405A   4/1979 United Kingdom .
2034148A   5/1980 United Kingdom .
2072452A   9/1981 United Kingdom .
2167279A   5/1986 United Kingdom .

OTHER PUBLICATIONS

Kume et al., "Newly Developed PMT's with Position Sensitivity Capability", IEEE Trans. on Nuclear Science, vol. NS-32, No. 1 (Feb. 85), pp. 448-452.

Primary Examiner—Janice A. Howell
Assistant Examiner—Richard Hanig
Attorney, Agent, or Firm—Finnegan, Henderson, Farabow, Garrett & Dunner

[57] ABSTRACT

A position-sensitive radiation detector has a plate-like scintillator and a photomultiplier tube array that are connected each other. At least one of scintillator surfaces of a radiation incidence-side and a connection-side to the photomuliplier tube array is provided with plural grooves. This structure enables the detection of the depth of a scintillation point in the scintillator and the detection of the scintillation point in horizontal direction with high resolution.

10 Claims, 5 Drawing Sheets

POSITION-SENSITIVE RADIATION DETECTOR

BACKGROUND OF THE INVENTION

1. Field of the Invention

This invention relates to a high-resolution position sensitive radiation detector, which can also detect the position in depth of radiation absorption in a scintillator.

2. Prior Art

A conventional position-sensitive radiation detector has been disclosed in which independent scintillators in a columnar form are bound together in a mosaic and connected to a position-sensitive photodetector (Japanese Patent Application Laid-open No. 237081/1986, Japanese Patent Application Laid-open No. 271486/1986). Another device is known in which a monolithic plate scintillator is connected to a position-sensitive photo-detector such as a photomultiplier tube (PMT) array, or the like for use as a position-sensitive radiation detector which can also detect the position in depth of radiation absorption in a scintillator (J. G. Rogers et al., Phys. Med. Biol. (1986), Vol. 31, No. 10, pp. 1061 to 1090).

FIG. 1 shows a conventional radiation detector in which a position-sensitive photo-detector is connected to a plate-like scintillator. In this drawing, reference numeral 1 represents the scintillator, reference numeral 2 represents the position-sensitive photo-detector, reference numerals 3 and 4 represent gamma rays, and reference numerals 5 and 6 represent scintillation light.

In this figure, the positions upon which the gamma rays 3 and 4 are made incident are detected by making use of the distribution positions of scintillation light outputted from the scintillator 1, for example, by calculating the center of gravity of the outputted light distribution. The radiation absorbed positions A and B in a vertical direction (the depth of scintillation points) are also detected by using the extent of distribution of the outputted light.

However, the type of position-sensitive radiation detector which uses a mosaic-shaped BGO (Bismuth Germanate) cannot obtain the information on the depth of the radiation absorption in a scintillator, that is, the information on the depth of the scintillation point. Furthermore, assembling such a detector requires much labor and is costly. Although the radiation detector device shown in FIG. 1 can obtain the information on the depth of the radiation absorption in a scintillator, the light is distributed over a very large area, particularly when the scintillation light is emitted in an upper portion of the scintillator. This causes the deterioration of position resolution. The position resolution R is given by R $\alpha \sigma/\sqrt{N}$, where the spread of light distribution is represented by $\sigma$, and the number of emitted photons is represented by N. Therefore, in the detector shown in FIG. 1 in which the spread of light output distribution $\sigma$ is large, the position resolution R deteriorates.

To obtain the information on the depth of the light scintillation point in the scintillator it is helpful to reduce to positional error called a parallax error, which is important for applications to positron CT and so on. The occurrence of the parallax error Δ is illustrated in FIG. 2. When two radiation rays are diagonally made incident on the scintillator 1 with the same incident direction and position, are absorbed at the different positions A and B, and scintillation light is emitted from positions A and B, these two radation rays are detected as if these two rays have different incident positions (the parallax error Δ). (If the scintillator 1 is sufficiently thin, that is, a width t is small enough, these two radiation rays are substantially detected as the same ones with the same incident position O.) If the information D on the absorption depth is obtianed, this type of error can be eliminated.

SUMMARY OF THE INVENTION

An object of the present invention is, therefore, a position-sensitive radiation detector that can obtain information on the depth of the scintillation point in a scintillator.

Another object of the present invention is a radiation detector having an improved position resolution.

A further object of the present invention is a radiation detector that can be easily assembled and manufactured.

The position-sensitive radiation detector according to the present invention comprises a scintillator having a horizontal and a vertical extent and having a top surface and a bottom surface, the surfaces extending horizontally and defining therebetween the vertical extent of the scintillator, a plurality of regularly aligned reflection means extending from at least one of the top surface and the bottom surface of the scintillator for reflecting light emitted from a scintillation point in the scintillator, position-sensitive photo-detector optically coupled to the scintillator and disposed along the bottom surface of the scintillator for detecting light emanating from the bottom surface of the scintillator, and a scintillation position computer for determining a scintillation position in both horizontal and vertical direction.

Other and further objects, features and advantages of the invention will appear more fully from the following description taken in connection with the attached drawings.

DESCRIPTION OF THE PREFERRED EMBODIMENTS

Embodiments of the present invention will now be described with reference to the accompanying drawings.

Figure 3B:
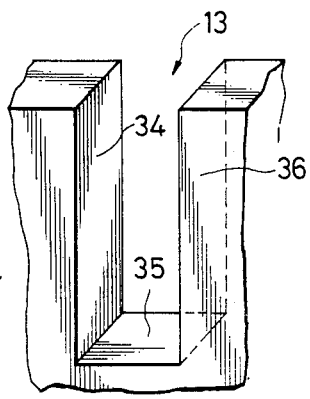
FIG. 3(b) is an enlarged view of a groove in the scintillator of FIG. 3(a)
Figure 3A:
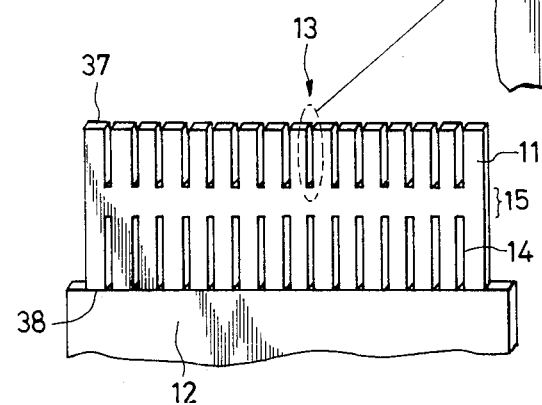
FIG. 3(a) illustrates a poistion-sensitive radiation detector of one dimension according to an embodiment of the present invention including a scintillator having grooves and a position-sensitive photo-detector.
Figure 4:
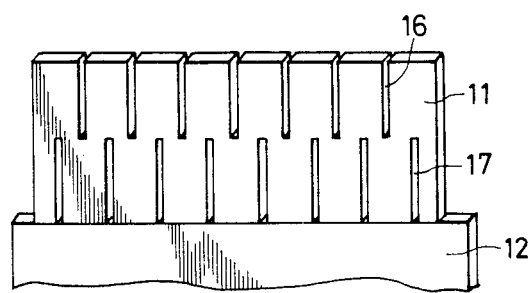
FIG. 4 illustrates another embodiment of a position-sensitive radiation detector of one dimension in accordance with the present invention.

FIG. 3 and 4 illustrate position-sensitive radiation detectors according to embodiments of the present invention, wherein reference numeral 11 represents a scintillator, reference numeral 12 represents a position-sensitive photo-detector, reference numerals 13, 14, 16, and 17 represent grooves, and reference numeral 15 represents a light guide region.

Referring to these figures, the grooves 13, 14 or 16 and 17 are provided in the scintillator 11 which is originally a plate-like BGO block by, for example, milling it from both top surface 37 and bottom surface 38. As embodied herein, top surface 37 is the radiation incidence side of scintillator 11. That is, it is the side of scintillator 11 upon which gamma rays, or other desired rays of radiation, are incident. Bottom surface 38 is the connection side of scintillator 11. That is, the scintillator 11 is optically coupled to the position-sensitive photo-detector 12 through the bottom surface 38. The top surface 37 and the bottom surface 38 extend along the horizontal extent of scintillator 11.

In accordance with the present invention, a plurality of regularly-aligned reflection means are provided from at least one of the top surface and the bottom surface of the scintillator for reflecting light emitted from a scintillation point in the scintillator. As embodied herein the reflection means are grooves, such as 13, that extend from the top surface 37, the bottom surface 38 or from both surfaces 37 and 38 of scintillator 11.

Figure 1:
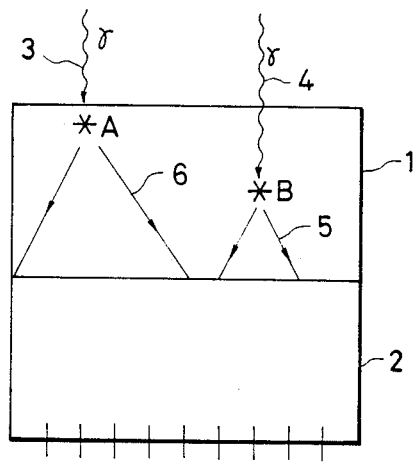
FIG. 1 illustrates a conventional position-sensitive radiation detector in which a plate-like scintillator is connected to a position-sensitive photodetector.
Figure 2:
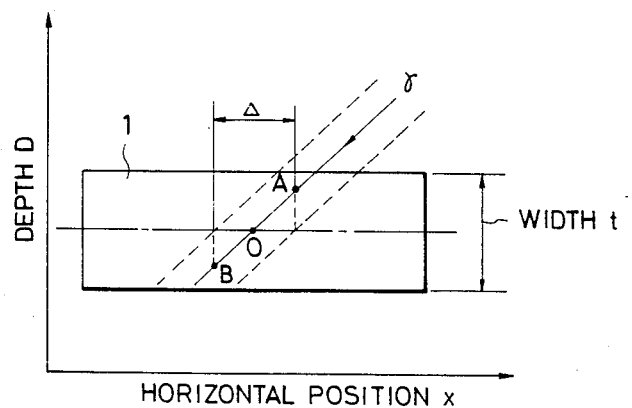
FIG. 2 illustrates the occurrence of a parallax error in a position-sensitive radiation detector.

FIG. 3(b) is an enlarged view of the groove 13 of FIG. 1. The groove 13 is defined by two opposing walls 34 and 36 formed in the scintillator 11. The bottom of the groove 13 is defined by a bottom face 35. The walls 34 and 36 establish an interface between the scintillator 11 and the air in the groove 13. If desired, the walls 34 and 36 can be provided with a reflecting coating or, alternatively, groove 13 can be filled with a reflective substance. The purpose of the walls 34 and 36 is to establish an interface whereby the light emitted from the scintillation point in the scinitillator 11 is selected in the manner described below.

Because of a difference in refractive index between air layers formed in the grooves and a scintillator material or existence of reflective substance disposed in the grooves, the emitted light is reflected by the groove walls 34 and 36. As a result of this, the same effect of narrowing the spatial distribution of output light as that obtained by a device in which the scintillators are arranged in a mosaic can be obtained. Furthermore, the information on the depth of the radiation absorption can be obtained as described below in detail.

The grooves may be provided in the scintillator in such a manner that, as shown in FIG. 3(a), the upper grooves 13 and the lower grooves 14 are aligned opposite each other (pattern A), or as shown in FIG. 4, the grooves 16 and 17 are arranged alternately (pattern B). It is desirable for the groove wall surfaces after cutting has been completed to be nearly mirror surfaces.

Furthermore, by enclosing reflective substance such as, for example, $BaSO_4$ in the grooves, the efficiency of reflection can be further increased. Thereby, a complete separation between adjacent scintillator segments can be achieved. In the pattern shown in FIG. 3(a), a light guide region 15 is provided between the upper grooves and the lower grooves in the scintillator 11.

Figure 5:
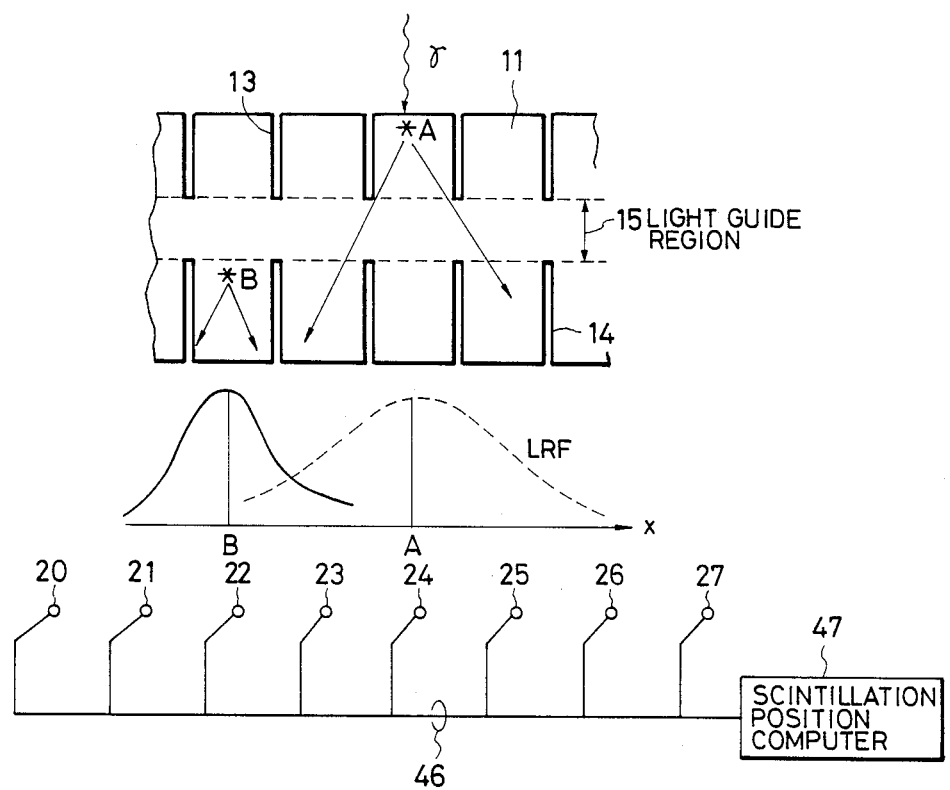
FIG. 5 illustrates a method of detecting a scinillation position by means of the radiaiton detector shown in FIG. 3(a)

FIG. 5 illustrates a method of detecting light emanating from the scintillator and computing the radiation incidence position according to the radiation detector shown in FIG. 3(a), wherein reference numerals 20 to 27 represent multi-anodes.

Referring to this figure, when the light is emitted at a position A in the upper portion of the scintillator 11, spatial distribution of light is widened in the light guide region 15 through downward light propagation, thereby light outputs are obtained from a plurality of lower segments. As a result, the light response function (LRF) has a relatively large distribution spread as shown by a dashed line in the FIG. 5.

When the light is emitted at a position B in the lower portion of the scintillator 11, light output is mainly obtained from a single lower segment, as a result of which, the LRF is narrow as illustrated by a solid line in the figure.

Therefore, by detecting, for example, the number of wire anodes of multi-anode PMT whose corresponding outputs exceed a given threshold value, the radiation incidence horizontal position and the scintillation depth can be determined. For reference, anode outputs from anodes 20–27 corresponding to the light output distribution from the scintillator are shown in Table 1. If each output of the multi-anode PMT corresponding to each anode exceeds the threshold value the value of "1" is given, and if it does not exceed the threshold value the value of "0" is given. As an example, the scintillator includes grooves having a 4 mm pitch and the pitch of the wire anodes is also 4 mm.

TABLE 1

| (Upper light emission) #20 ... #27 | (Lower light emission) #20 ... #27 |
| --- | --- |
| 0 0 1 1 1 0 0 0 | 0 0 0 0 0 0 0 0 |
| 0 1 1 1 1 1 0 0 | 0 0 1 1 1 0 0 0 |
| 0 0 0 1 1 1 0 0 | 0 0 0 0 1 0 0 0 |
| 0 0 0 1 1 0 0 0 | 0 0 0 0 0 0 0 0 |
| 0 0 1 1 1 0 0 0 | 0 0 0 0 0 0 0 0 |
| 0 0 0 0 0 1 1 0 | 0 0 1 1 1 0 0 0 |
| 0 1 1 1 1 1 0 0 | 0 0 1 1 1 0 0 0 |
| 0 1 1 1 1 1 0 0 | 0 0 1 1 1 0 0 0 |
| 0 0 0 1 1 1 0 0 | 0 0 0 0 0 0 0 0 |
| 0 0 1 1 1 1 0 0 | 0 0 0 1 1 1 0 0 |
| 0 0 1 1 1 0 0 0 | 0 0 0 1 0 0 0 0 |
| 0 0 1 1 1 0 0 0 | 0 0 0 1 0 0 0 0 |
| 0 1 1 1 1 1 0 0 | 0 0 1 1 1 0 0 0 |
| 0 0 1 1 1 0 0 0 | 0 0 0 1 0 0 0 0 |
| 0 1 1 1 1 0 0 0 | 0 0 1 1 1 0 0 0 |
| 0 0 1 1 1 0 0 0 | 0 0 0 1 0 0 0 0 |
| 0 0 1 1 1 1 0 0 | 0 0 1 1 1 0 0 0 |
| 0 1 1 1 1 0 0 0 | 0 0 1 1 0 0 0 0 |

Judging from Table 1, a case where "1" appears in sequence occurs more frequently when the light is emitted in the upper portion in comparison to that when light is emitted in the lower portion. With making use of this characteristic, it can be determined from which of the upper portion and the lower portion of the scintillator the light is emitted when the radiation is absorbed. The position in the horizontal direction can be determined by the center of gravity of the wire-anode outputs. As shown in FIG. 5, the output from each of anodes 20–27 passes along a line 46 to a scintillation position computer 47. The computer determines, in the manner described above, the scinillation position in the horizontal direction and in the vertical direction (depth) in the scintillator 11.

Using the foregoing apparatus in a PET (Positron Emission Tomography) device with a small ring diameter, the deterioration of resolution in the radial direction in the periphery can be restrained.

Figure 6:
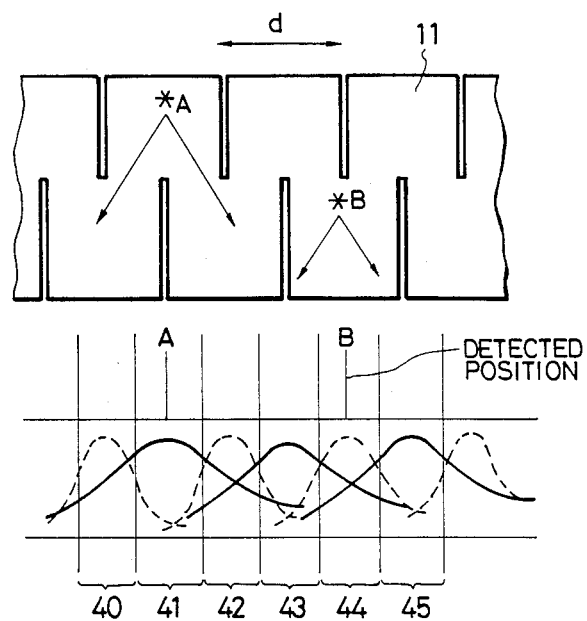
FIG. 6 illustrates a method of detecting a scintillation position by means of the radiation detector shown in FIG. 4.

FIG. 6 illustrates a method of position detection by means of the radiation detector shown in FIG. 4. When the light is emitted at a position A in the upper portion of the scintillator 11, in the downward propagation the light is equally distributed to two segments in the lower portion of the scintillator 11. On the other hand, when the light is emitted at a position B in the lower portion of the scintillator, the light emanates from one segment in the lower portion of the scintillator.

The distribution of the LRF is shown by the solid line when the light is emitted in the upper portion of the scintilator, and is as shown by the dashed line when radiation is emitted in the lower portion of the scintillator.

The calculated positions of the center of gravity should shift each other by a half of the groove pitch, d. Therefore, by making the width of bins 40–45 to be d/2 and disposing the bins 40–45 in such a manner as illustrated in FIG. 6, each bin alternately gives the detected position with the scintillation point in the upper portion and that with the scintillation point in the lower portion, thereby the information (1 bit) on the scintillation depth can be obtained. For example, bins 40, 42 and 44 provide detection of scintillation points in the lower portion while bins 41, 43 and 45 provide detection of scintillation points in the upper portion.

The importance of obtaining information on the depth will now be described with reference to a radiation tomography device.

Figure 7:
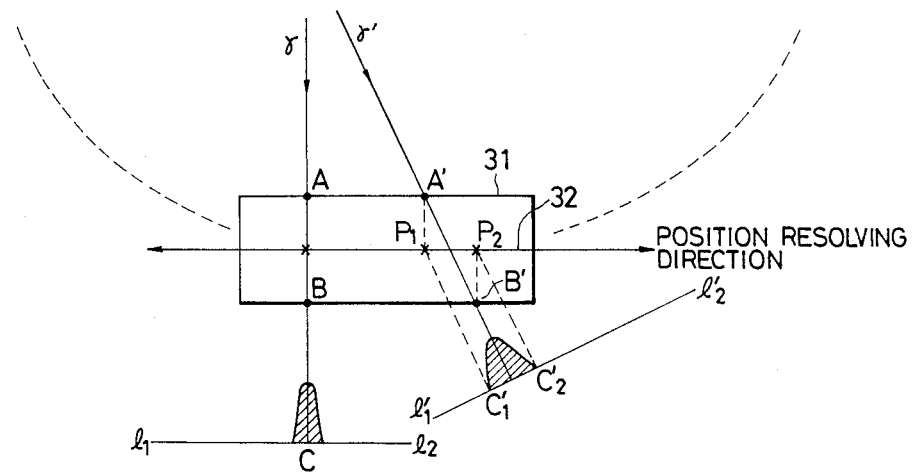
FIG. 7 illustrates the occurrence of a detection error in a radiation tomography device.

FIG. 7 illustrates the occurrence of a detection error in a radiation tomography device, wherein reference numeral 31 represents a scintillator and reference numeral 32 represents a center line of the scintillator.

As the angle of incidence of radiation made upon the scintillator becomes large, a positional error called a parallax error occurs that is related to the depth of absorption. Many radiation tomography devices have the detecting device disposed annularly and detect incidence positions of gamma rays with various angles of incidence. The detected results are accumulated as data on the line $l_1$–$l_2$ and $l'_1$–$l'_2$, thus, generating projection data. The incidence angles of gamma rays can be obtained from the collimater direction in the case of single gamma ray, or by connecting the positions which are detected at the same time in the case of positron annihillation gamma rays (two gamma rays emitted in the opposite directions). When a gamma ray is made incident on the scintillator diagonally, the gamma ray is detected with a certain width $P_1$–$P_2$ on the scintillator center line and is recorded also with a certain spread $C'_1$–$C'_2$ on the projection data compared with those in the parpendicular incidence.

Therefore, the measurement accuracy of incidence position of gamma rays when they are diagonally made incident deteriorates as the incidence angle becomes large, or as the thickness of the scintillator becomes greater; in other words, the position resolution deteriorates. If the scintillator is made thin, the detection efficiency of gamma rays deteriorates.

In these cases, according to the present invention, by obtaining the information on the depth of absorption of gamma rays, the illustrated width $P_1$–$P_2$ can be decreased, thereby the position resolution for the diagonally incident gamma rays can be improved.

Figure 8:
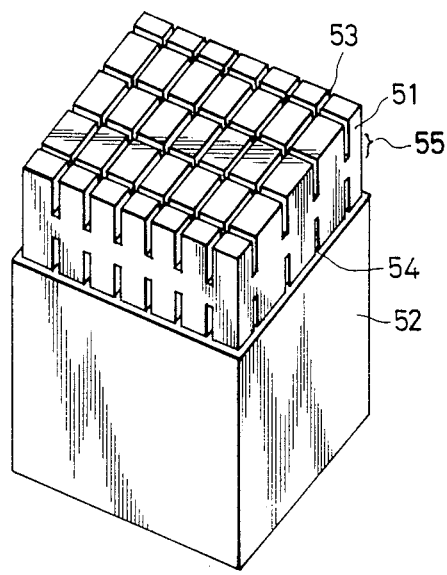
FIG. 8 illustrates a radiation detector of two dimensions accoridng to an embodiment of the invention.
Figure 9:
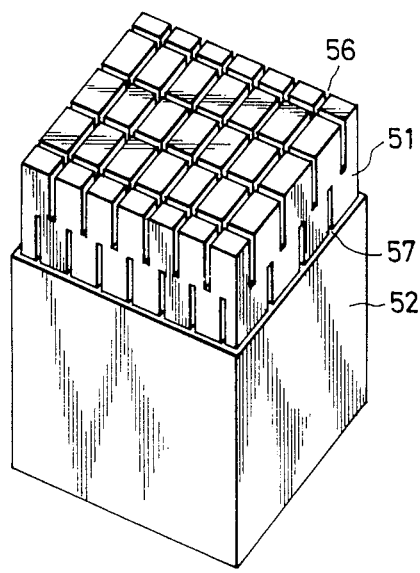
FIG. 9 illustrates another embodinet of a radiation detector of two dimensions in accordance with the invention.

Although the foregoind description is devoted to the position-sensitive radiation detectors with horizontally one-dimensional structure which can determined the radiation incidence position (i.e., the scintillation position) in the horizontal one dimension, the horizontally two-dimensional position detection can be realized with the present invention by employing a lattice-shaped groove. FIGS. 8 and 9 illustrate two-dimensional position-sensitive radiation detectors accoridng to embodiments of the invention, wherein reference numeral 51 reprsents a scintillator, reference numeral 52 represents a position-sensitive photo-detector, reference numerals 53, 54, 56 and 57 represent grooves and reference numeral 55 represents a light guide region. Structures of the two-dimensional radiation detectors in FIG. 8 and 9 correspond to those of the one-dimensional radiation detectors in FIG. 3 and FIG. 4, respectively.

The grooves 53, 54, 56 and 57 of the lattice shape provided in the scinillator 51, wherein each lattice-shaped groove has regular intervals in two horizontal directions orthogonal each other. The position-sensitive photo-detector 52 is optically coupled to the scintillator 51. Operations of determining the radiation incidence position with the detection of the scintillation depth in these two-dimensional radiaiton detector are same as the operations in the respective one-dmensional radiation detectors except for the dimensional difference.

Although the scintillator in the plate-like shape is describe in the above embodiments, it may be in any desired shape, such as a columnar shape, for example. Furthermore, the grooves in the scintillator may be provided for either one of the radiation incidence or the connection sides of the scintillator as an alternative to grooves provided in both sides.

According to the present invention, the position in the scintillator upon which radiation is made incident can be detected with excellent accuracy. Furthermore, as the information on the depth of the scintillation point in in the scintillator can be obtained, the positional resolution can be improved, and assembling and manufacturing of the scintillator is simplified as a result of which, the production cost can be reduced.

It will be apparent to those skilled in the art that various modifications and variations can be made in the radiation detection device of the present invention without departing from the scope of spirit of the invention. Thus, it is intended that the present invention cover the modifications and variations of this invention provided they come within the scope of the appended claims and their equivalents.

What is claimed is:

1. A position-sensitive radiation detector comprising:
a scintillator having a horizontal extent and vertical extent and having a top surface and a bottom surface, said surfaces principally extending in one horizontal direction and defining therebetween said vertical extent of said scintillator;
a plurality of reflection means having regular intervals in said one horizontal direction and extending from at least one of said top surface and said bottom surface of said scintillator, for reflecting light emitted from a scintillation point in said scintillator;
position-sensitive photo-detecting means optically coupled to said scintillator and disposed along said bottom surface of said scintillator, for detecting light emanating from said bottom surface of said scintillator; and a scintillation position computer for determining, by calculation of the depth of a scintillation point in said scintillator, a scintillation position in said one horizontal direction and in a vertical direction.

2. A position-sensitive radiation detector as claimed in claim 1, wherein said bottom surface s substantially flat and said plurality of reflection means are substantially planer grooves extending in a direction substantially perpendicular to said bottom surface.

3. A position-sensitive radiation detector as claimed in claim 2, wherein said grooves are filled with BaSO$_4$.

4. A position-sensitive radiation detector as claimed claim 2, further including:
   upper grooves extending vertically from said top surface and lower groove extending vertically from said bottom surface, said upper grooves and said lower grooves being aligned opposite each other; and
   a light guide region between said upper grooves and said lower grooves.

5. A position-sensitive radiation detector as claimed in claim 2, further including upper grooves extending vertically from said top surface and lower grooves extending vertically from said bottom surface having equal pitches, said upper grooves and said lower grooves being aligned alternately each other.

6. A position-sensitive radiation detector, comprising:
   a scintillator having a horizontal extent and a vertical extent and having a top surface and a bottom surface, said surfaces extending in two horizontal dimensions and defining therebetween said vertical extent of said scintillator;
   lattice-shaped reflection means having regular intervals in two-horizontal directions orthogonal each other and extending from at least one of said top surface and said bottom surface of said scintillator, for reflecting light emitted from a scintillation point in said scintillator;
   position-sensitive photo-detecting means optically coupled to said scintillator and disposed along said bottom surface of said scintillator, for detecting light emanating from said bottom surface of said scintillator; and
   a scintillation position computer for determining, by calculation of the depth of a scintillation point in said scintillator, a scintillation position in said two horizontal directions and in a vertical direction.

7. A position-sensitive radiation detector as claimed in claim 6, wherein said bottom surface is substantially flat and said lattice-shaped reflection means is constituted by substantially planar grooves extending in a direction substantially perpendicular to said bottom surface.

8. A position-sensitive radiation detector as claimed in claim 7, wherein said grooves are filled with BaSO$_4$.

9. A position-sensitive radiation detector as claimed in claim 7, further including:
   an upper lattice groove extending vertically from said top surface and a lower lattice groove extending vertically from said bottom surface, said lattice grooves being aligned opposite each other; and
   a light guide region between said upper lattice groove and said lower lattice groove.

10. A position-sensitive radiation detector as claimed in claim 7, further including an upper lattice groove extending vertically from said top surface and a lower lattice groove extending vertically from said bottom surface having equal lattice intervals in each of said two horizontal directions, said lattice grooves being aligned alternately each other.

* * * * *

UNITED STATES PATENT AND TRADEMARK OFFICE
CERTIFICATE OF CORRECTION

PATENT NO. : 4,831,263

DATED : May 16, 1989

INVENTOR(S) : Takaji Yamashita

It is certified that error appears in the above-identified patent and that said Letters Patent is hereby corrected as shown below:

Claim 2, column 7, line 6, change "s" to --is--.

Signed and Sealed this

Twenty-eighth Day of August, 1990

Attest:

HARRY F. MANBECK, JR.

*Attesting Officer*     *Commissioner of Patents and Trademarks*